(No Model.)

W. JOSLIN.
CAR WHEEL.

No. 311,837. Patented Feb. 3, 1885.

WITNESSES
Wm. M. Monroe.
Morton W. Cope.

INVENTOR
William Joslin
By Thos. B. Hall
Attorney

---

UNITED STATES PATENT OFFICE.

WILLIAM JOSLIN, OF PAINESVILLE, OHIO.

CAR-WHEEL.

SPECIFICATION forming part of Letters Patent No. 311,837, dated February 3, 1885.

Application filed February 16, 1884. (No model.)

*To all whom it may concern:*

Be it known that I, WILLIAM JOSLIN, a citizen of the United States, residing at Painesville, county of Lake, and State of Ohio, have invented certain new and useful Improvements in Wheels; and I do hereby declare the following to be a description of the same, and of the manner of constructing and using the invention, in such full, clear, concise, and exact terms as to enable any person skilled in the art to which it appertains to construct and use the same, reference being had to the accompanying drawings, forming a part of the specification, the principle of the invention being herein explained, and the best mode in which I have contemplated applying that principle so as to distinguish it from other inventions.

The object of this invention is to provide a wheel in which the relative construction and adjustment of tire and wheel-body furnish ready means for remedying any occurring looseness of the tire.

Figure 1:
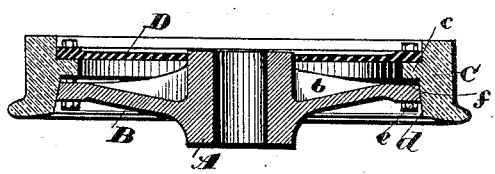
Figure 2:
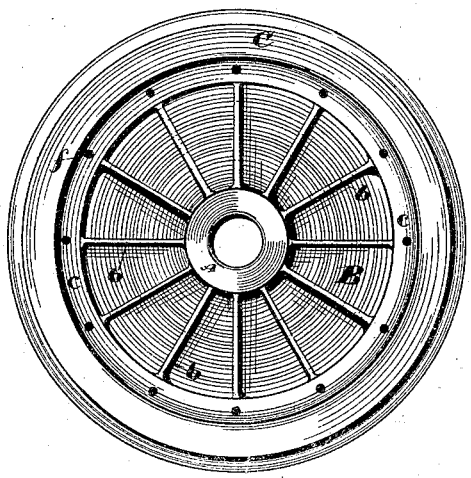

Figure 1 is a diametric section of a car-wheel, illustrating the principle of my invention. Fig. 2 is an outer side elevation thereof, with the face-plate removed.

A is the hub, B the wheel-body, and $b$ the braces. The tire C is made independently of the wheel-body, and is provided on its inner periphery with the annular flange $c$. The portion $d$ of the inner periphery of the tire is formed as a bevel, inclining outwardly from the flange $c$. The circumference of the wheel-body is formed as a counterpart bevel, $e$, inclining in cross-line at the same angle as the tire-bevel. Bolts $f$ severally pass at different points through the marginal portions, respectively, of the wheel-body and face-plate D, and also through the said tire-flange. The joining surfaces of wheel-body and tire are thus united in counterpart wedge shape, and the relative diameters of the wheel-body and the inner periphery of the tire are such that the wheel-body can be adjusted nearer to the said flange, as occasion may require, for the tightening of the tire, the diameter of said wheel-body being of greater dimension in the plane of its face next to said flange than is the diameter of the tire-incline at the point of its immediate junction with said flange, said difference in said diameters creating an open space between said wheel-body and said flange, thereby providing room for the adjustment aforesaid, which spreads the tire radially outwardly.

In fitting the parts together, as the wheel is set up a comparatively slight pressure suffices to wedge the wheel-body within the tire and render the wheel firm. The angle of inclination of the bevel-surfaces mentioned may be of any desired degree.

By the adjustable mechanism thus described the well-known tendency of car-wheels to become loose and shaky is adequately provided against. Face-plate D serves to bind the portions of the tire together in case of the latter's fracture.

What, therefore, I claim is—

A car-wheel consisting in the combination, with the tire C, provided with the flange $c$ and the incline $d$, of the wheel-body B, having greater diameter in the plane of its face next to said flange than is the diameter of that portion of said tire-incline at its immediate junction with said flange, said difference of said diameters normally creating an open space between said wheel-body and said flange, the joining faces $d$ and $e$ of said tire and wheel-body being counterpart inclines to each other, and bolts $f$, connecting together said flange and wheel-body, said parts being adapted to permit the drawing of the wheel-body by said bolts in lateral wedge movement toward said flange, thereby spreading the tire radially outwardly, by which operation any looseness of the tire is remedied, substantially as set forth.

In testimony that I claim the foregoing to be my invention I have hereunto set my hand this 13th day of February, A. D. 1884.

WILLIAM JOSLIN.

Witnesses:
MORTON W. COPE,
THOS. B. HALL.